United States Patent [19]

Falk

[11] 4,093,052

[45] June 6, 1978

[54] FLUID ACTUATED COUPLING ASSEMBLY

[75] Inventor: Curt Gunnar Falk, Sollentuna, Sweden

[73] Assignee: Forenade Fabriksverken, Sweden

[21] Appl. No.: 660,682

[22] Filed: Feb. 23, 1976

Related U.S. Application Data

[63] Continuation-in-part of Ser. No. 435,728, Jan. 23, 1974, abandoned.

[51] Int. Cl.² ............................................. F16D 1/06
[52] U.S. Cl. .................................. 192/88 B; 403/372
[58] Field of Search ............... 192/88 B, 70.13; 403/5, 403/31, 227, 372; 92/91, 35; 188/367

[56] References Cited

U.S. PATENT DOCUMENTS

| | | | |
|---|---|---|---|
| 2,093,281 | 9/1937 | Kreuser | 192/88 B X |
| 2,251,444 | 8/1941 | Fawick | 192/88 B |
| 3,547,244 | 12/1970 | Fergle | 192/88 B X |
| 3,804,221 | 4/1974 | Valantin | 192/88 B |
| 3,861,815 | 1/1975 | Landaeus | 192/88 B X |

*Primary Examiner*—Benjamin W. Wyche
*Attorney, Agent, or Firm*—Stevens, Davis, Miller & Mosher

[57] ABSTRACT

A fluid actuated coupling assembly for releasably coupling together of at least two elements and preferably transmitting torque between them. An inner metal sleeve and an outer metal sleeve are secured together to define a very thin gap between them. Means are provided to pressurize that gap to cause radial expansion of the gap and the sleeves.

9 Claims, 5 Drawing Figures

FLUID ACTUATED COUPLING ASSEMBLY

This application is a continuation-in-part of application Ser. No. 435,728 of Jan. 23, 1974 (now abandoned).

The present invention refers to a fluid actuated coupling assembly for releasably coupling at least two elements together preferably for transmitting of torque therebetween and comprising an outer sleeve, an inner sleeve concentrically mounted within the outer sleeve and secured thereto at least at one end and defining a recess between the outer sleeve and the inner sleeve, and means for introducing a pressure fluid in said recess, the radial dimension of the sleeve walls being variable by changing the pressure on the pressure fluid in the said recess.

Fluid actuated coupling assemblies of the above mentioned kind are previously known in which the recess containing the pressure fluid is of relatively large volume. Such coupling assemblies are often used for releasably mounting of a wheel or the like on a shaft and for general purposes the priorly known coupling assemblies give a good result.

The priorly known coupling assemblies are however disadvantageous in several respects when used in an environment which is subjected to strong temperature changes. The pressure fluid which is generally an oil or a fat product generally has a coefficient of expansion which is much higher than the coefficient of expansion for the inner sleeve and the outer sleeve which are normally made of steel. Generally the coefficient of expansion for the pressure fluid is a tenth power higher than that of steel.

When subjecting a coupling assembly of the above mentioned kind to high temperatures the pressure fluid expands much more than the steel sleeves and in case of strong temperature differences this may cause a deformation of the coupling and it may even make the coupling burst. It is further difficult to obtain a good sealing at the very high pressures which are obtained when raising the temperature to a high level.

With high temperatures is in this connection is meant temperatures of upto 100°–125° C of the pressure medium and with low temperatures is meant temperatures of −30° C or lower.

On the contrary when lowering the temperature the pressure fluid contracts much stronger than the steel sleeves and the torque transmitting ability is lowered accordingly, and it may even happen that one of the elements or both are disconnected from the coupling assembly at extreme low temperatures.

Attempts have been made to overcome the above disadvantages by substituting the pressure fluid by some pressure medium which has a lower coefficient of expansion than the above mentioned liquid or fat, but no coupling assemblies known until now have eliminated or substantially reduced the said disadvantages so that the coupling may be used subjected to strong temperature differences.

The object of the invention therefore is to provide a fluid actuated coupling assembly for releasably coupling of at least two elements together which may be used even subjected strong temperature differences without being deformed due to extreme expansions or contractions of the pressure fluid, which does not loosen in case of lowering the temperature and in which there are no serious sealing problems depending on strong pressure rise when subjecting the coupling to strong temperature increase.

DETAILED DESCRIPTION

A temperature rise $\Delta T$ causes a pressure rise $\Delta P$ within the recess of the coupling due to the fact that the coefficient of expansion of the liquid $\gamma$ is higher than that of the inner sleeve and the outer sleeve. Mathematically the pressure rise may be expressed as follows:

$$\Delta P = \frac{\gamma \cdot \Delta T}{B + \frac{\pi \cdot d^2 \cdot L}{E \cdot (1 - c^2) \cdot V}} \quad (1)$$

in which $\Delta P$ is the pressure change, $\Delta T$ is the temperature change, $B$ is a constant of compressibility for the pressure fluid, $d$ is the average diameter of the recess of the coupling, $L$ is the length of said recess, $E$ is the module of elasticity for the steel of the shaft and the hub to be connected by the coupling, $c$ is the relation between the inner and the outer diameter of the hub to be connected and $V$ is the pressure fluid volume in the recess of the coupling.

Figure 1:
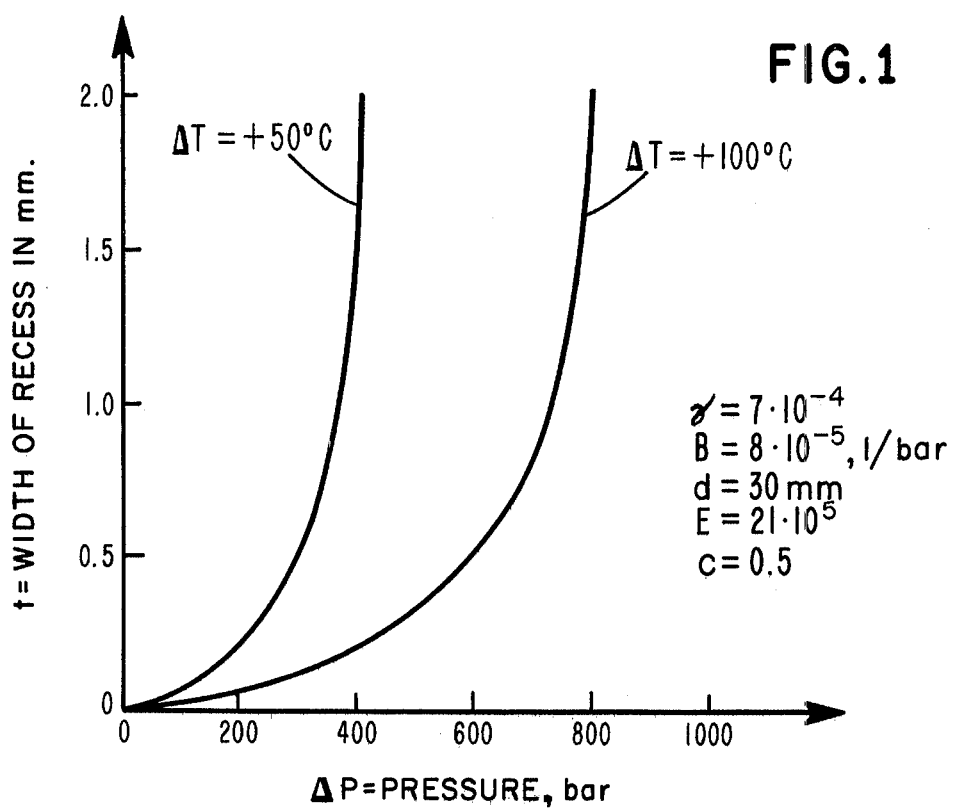
FIG. 1 and FIG. 2 illustrate the relationship between the volume of the recess and temperature induced pressure change in a coupling assembly.
Figure 2:
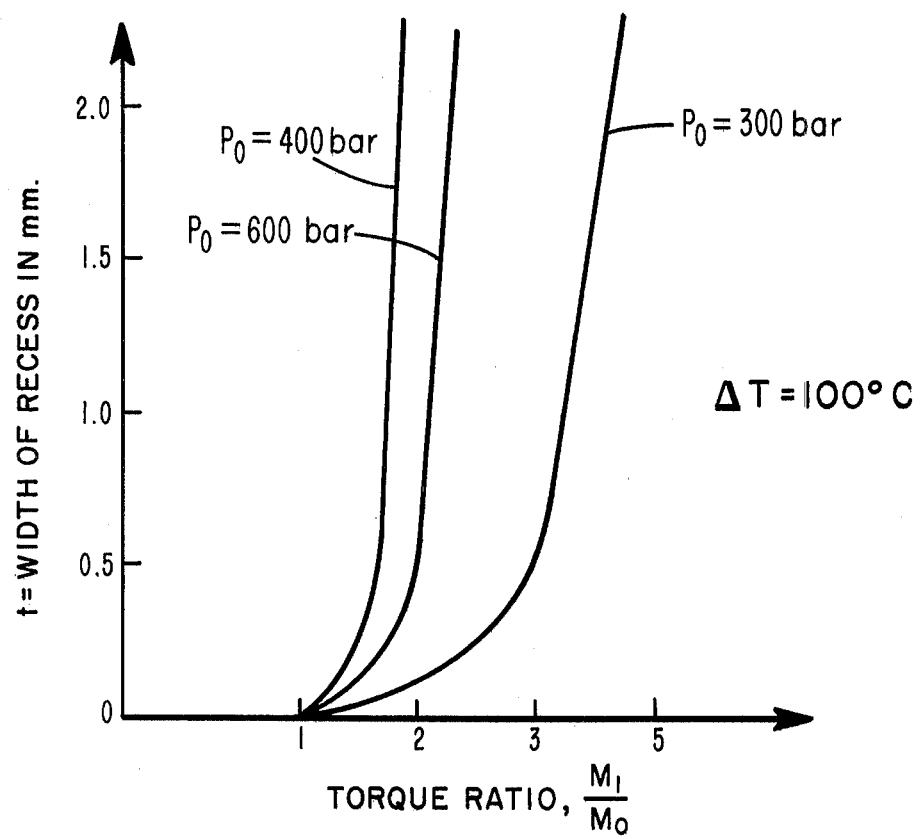

It is evident from the above formula that a temperature rise causes a pressure rise and that a volume change may reduce the effect of such temperature rises. In order to investigate the effect of different volume of the recess at temperature rises tests have been made the result of which are illustrated in FIGS. 1 and 2. In FIG. 1 is shown a diagram in which the pressure rise at two different temperature rises of 50° and 100° C respectively are plotted against a vertical axis showing the width of the recess between the inner sleeve and the outer sleeve. The pressure rise $\Delta P$ is expressed in bar (1 bar = 0.1 MPa) and the width of the recess in millimeter. All tests were made with a coupling having an average diameter of the recess of 30 millimeters, the coefficient of expansion for the liquid which in this case was a fat product was $7 \times 10^{-4}$, the constant of compressibility for the liquid $B = 8.10^{-5}$ 1/bar, the module of elasticity for the steel of the shaft and the tube to be connected was $21 \times 10^5$ bar and the relation between the inner and the outer diameter of the hub to be connected was 0.5.

It is evident from the diagrams that there are relatively small changes of $\Delta P$ for recesses of $t = 0.5$ and any larger recess width whereas there are relatively large differences for recesses of a width of less than 0.5 mm. It is therefore evident, that if the volume of the pressure fluid in the recess of the coupling is reduced to a value corresponding to less than 0.5 mm for the coupling illustrated in FIG. 1 it is possible to substantially reduce the pressure rise at temperature rises. To define the volume the width $t$ of the recess should be calculated considering the average diameter $d$ of the recess, and considering the said relationship it might be stated, that the value of $t:d$ should be less than about $2 \times 10^{-2}$.

It has been noted during the tests that the value of $t:d$ does not give identical results for different sizes of the coupling, and it has been noted that the value is slightly decreasing for increasing diameters, depending on the fact that the tolerance of large diameter couplings may be made relatively smaller than of small size couplings, but generally the following relationship should be fulfilled in order to reduce the pressure rise at rising temperatures:

$$t/d \leq 2 \cdot 10^{-2} \qquad (2)$$

In the ideal case the relationship $t:d$ should be 0, but for well known reasons this is not possible, and considering the particular characteristics it has been found suitable to define the said relationship to be the same as or less than $2 \times 10^{-2}$.

In FIG. 2 is illustrated a corresponding diagram showing the torque ratio at the point of slip between a hub and a shaft connected by the coupling assembly of the invention at different widths of the coupling recess and at different original pressures. In the diagram M relates to torque at slip generally, $M_0$ is such torque in the original state and $M_1$ is the torque at increased temperature. In all tests the temperature increase $\Delta T$ was $+100°$ C and there are plotted three different values corresponding to an original pressure of 900 bar, 600 bar and 300 bar respectively. The remaining values are the same as explained in connection to FIG. 1.

The tests illustrated in FIG. 2 confirms the result found in connection with the tests illustrated in FIG. 1, and it may be noted, that there are relatively small changes of the torque relation $M_1/M_0$ for a width of the recess larger than about 0.5 mm whereas there are large differences of $M_1/M_0$ for widths of the recess less than about 0.5 mm. The tests consequently confirms that the relationsip $t/d$ should be less than about $2 \times 10^{-2}$ in order to substantially reduce the effects of the temperature rises and the differences of $M_1/M_0$ due to such temperature changes.

Figure 3:
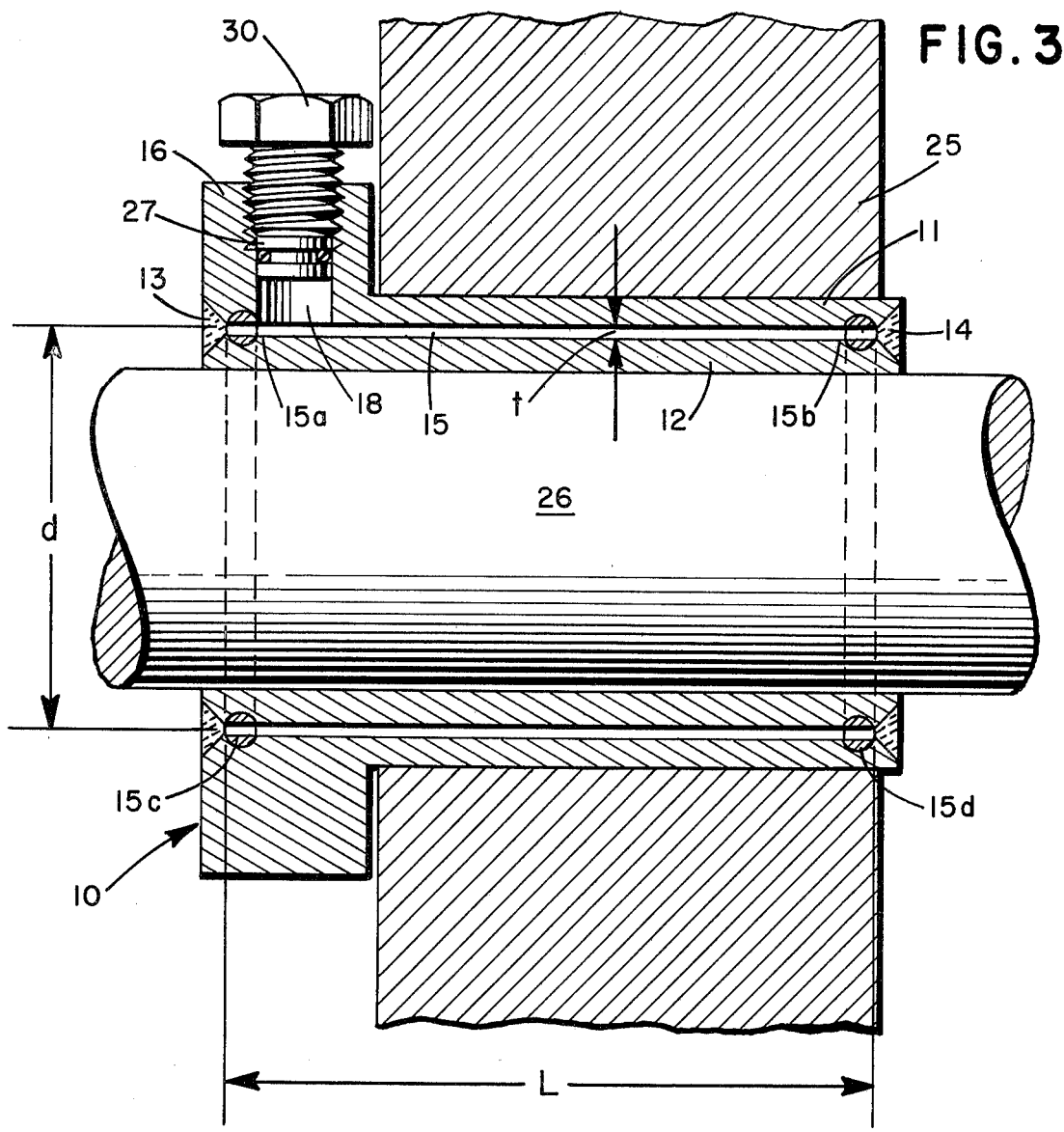
FIG. 3 illustrate in cross-section a coupling assembly.

Referring now to FIG. 3 there is shown a fluid actuated coupling assembly 10 which may be used e.g. for interconnecting a hub 25 and a shaft 26. The coupling assembly comprises an outer sleeve 11 and an inner sleeve 12 mounted co-axially within the outer sleeve 11 and secured thereto by means of ring-shaped welds 13 and 14 respectively. Alternatively to welding the co-axial sleeves may be connected by other technics such as soldering, fusion, glueing, screwing or rivetting technics. Both sleeves are assumed to be radially resilient, i.e. are assumed, among other things, to have relatively thin walls and to be made of a material which in the present context is sufficiently resilient to permit the sleeves to be bowed in opposing radial directions under the pressure actions of a pneumatic or preferably hydraulic pressure medium introduced to a zone or a gap 15 defined between the two sleeves 11 and 12. As will be evident from the figure bowing of respective sleeve will cause the outer sleeve to be brought into frictional engagement with the hub or wheel 25 and the inner sleeve 12 to be brought into frictional engagement with the shaft 26 so that the two elements are coupled together by the coupling assembly.

For the sake of clearness the gap 15 between the inner sleeve and the outer sleeve is illustrated relatively wide, but in order to be able to reduce the effect of the pressure change in the pressure medium depending on temperature changes the width $t$ of the recess for the gap 15 as considered in relation to the average diameter $d$ should fulfil the above relationship: $t/d \leq 2 \times 10^{-2}$.

As will be seen from FIG. 3 one end of the outer sleeve 11 is formed with a flange-like collar 16 in which there is a bore 18 which communicates with the gap 15. In the bore 18 there is a sealed piston 27 which may be forced radially inwards by means of a screw 30. In order to eliminate the risk of splitting the outer sleeve 11 and the inner sleeve 12 apart the ends of the gap 15a and 15b are formed as flutes, and in the said flutes 15a and 15b there are mounted annular filling elements 15c, 15d so as to reduce the volume of the gap 15. The filler elements 15c and 15d may be of any suitable material preferably having the same coefficient of expansion as the sleeves 11 and 12.

Figure 4:
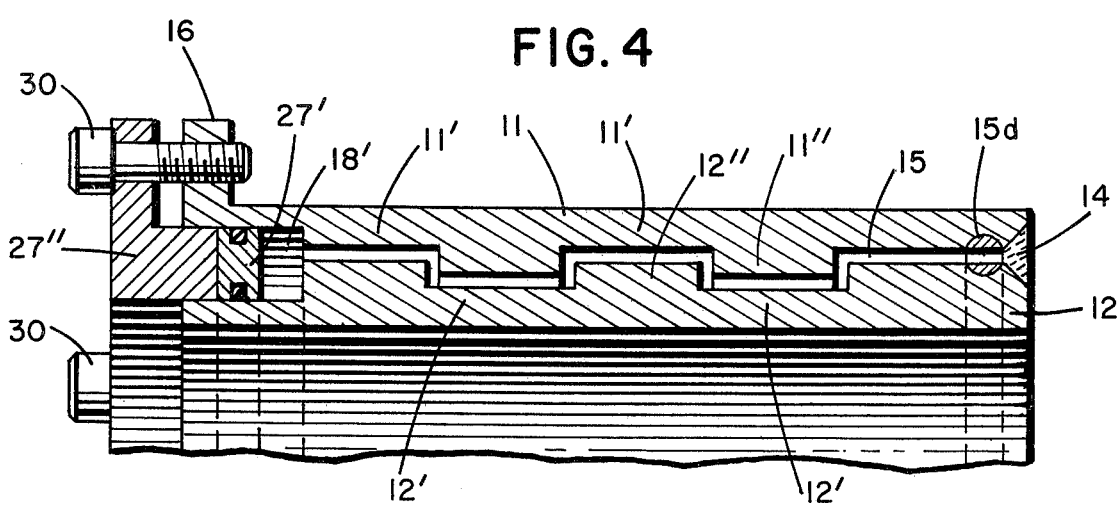
FIG. 4 illustrates in partial cross-section a modified coupling assembly.

In FIG. 4 there is shown a modified embodiment of the coupling assembly according to FIG. 3 likewise comprising an outer sleeve 11 and an inner sleeve 12 provided concentrically within the inner sleeve 11 and defining between the two sleeves a recess or gap 15. At one end the two sleeves are connected to each other by means of a weld 14, and at the opposite end the gap 15 opens in an axial annular recess 18' which is sealed by a sealing piston 27'. A collar pressure ring 27" is provided axially outside the piston ring 27', and the said collar pressure ring 27" may be forced against the piston ring 27' and inside the bore 18' by means of several screws 30 provided round the clutch assembly and co-operating with the collar 16 of the outer sleeve 11.

Figure 5:
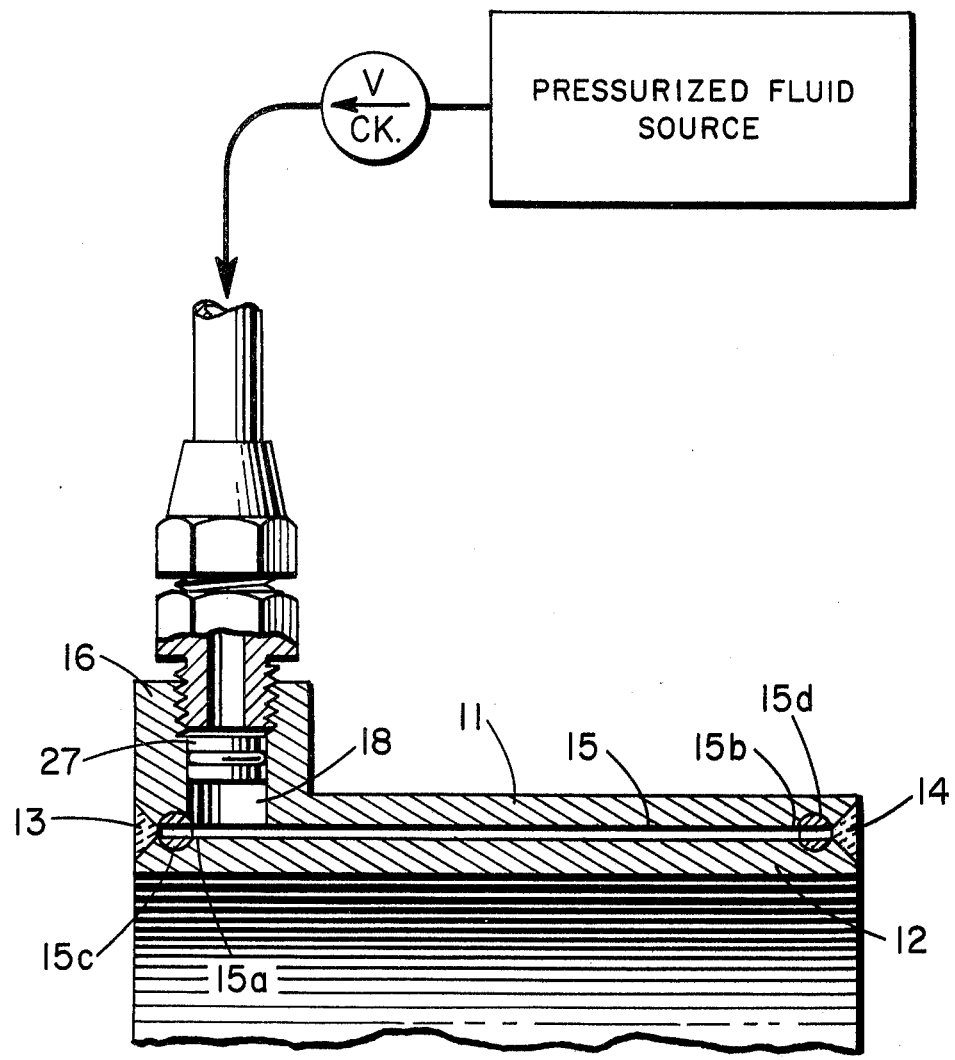
FIG. 5 illustrates the attachment of the FIG. 3 coupling to a pressure source through a one-way valve.

The means for providing a pressurization of the pressure fluid within the gap 15 may be of any suitabe kind and it may be a separate external means for introducing pressurized fluid in the gap as illustrated in FIG. 5, and in such an embodiment of the invention the sealing piston 27 or 27' is substituted by a one-way valve permitting introduction of pressurized fluid but preventing exhaust of such pressure fluid.

In order to further reduce the amount of pressure fluid in the gap 15 the said pressure fluid may contain small particles having a coefficient of expansion which is the same or nearly the same as that of the inner sleeve and the outer sleeve. By mixing the pressure fluid with such particles the amount of pressure fluid is correspondingly reduced.

The gap 15 defined between the sleeves 11 and 12 may have any suitable form, e.g. as illustrated in FIG. 4, in which the reduced sections, e.g. the sections 11' and 12' of the outer sleeve 11 give a slightly stronger engagement than the wider parts 11", 12".

In order to reduce the amount of pressure fluid in the gap 15 the outer sleeve or the inner sleeve may be formed with radial extensions normally engaging the inner sleeve or outer sleeve respectively but which, when introducing pressure fluid in the gap thereby slightly moving the sleeves 11 and 12 apart, provide a passageway for the pressure fluid. Alternatively there may be provided separate rings or similar elements in the gap which reduce the necessary amount of pressure fluid.

A friction coupling assembly of the type illustrated in the drawings has been used in hot rolling mills for mounting of roll sleeves on roll shafts in which the coupling was subjected to very high temperatures, and in which the pressure fluid, in spite of cooling of the mill rolls, had a temperature of up to 150° C. No change of the relationship $M_1/M_0$ was discovered between the roll shaft and the roll sleeve, and no deformation was discovered of the coupling. Thus the coupling according to the invention is useful in many applications where previously known couplings of the kind in question are disadvantageous due to the high volume of pressure medium in the gap or recess. The invention may be used both in applications where the coupling is subjected to very high temperature and where the coupling is subjected to very low temperature, and just by adapting the pressure of the pressure fluid to the circumstances the coupling may be prepared for the different purposes.

It is to be understood that the above specification is only of exemplifying character and that various modifications may be presented within the scope of the appended claims.

What I claim is:

1. A fluid actuated coupling assembly for releasably coupling at least two elements together preferably for transmitting torque therebetween comprising an outer metal sleeve, an inner metal sleeve concentrically mounted within the outer sleeve and secured thereto at least at one end and defining a recess or gap between the two sleeves which is closed at said one end of the sleeves, means for introducing a pressure fluid in said recess and means for preventing exhaust of said pressure fluid, said secured sleeves and said means for preventing exhaust of said pressure fluid defining a volume which includes said recess volume and which is slightly larger than said recess volume, the radial dimension of the sleeve walls of both sleeves being variable by changing the pressure on the pressure fluid on the said recess, the thickness of the recess in the non-pressurized state being determined by the following formula:

$$t/d = 2 \times 10^{-2}$$

where $t$ equals the width of the recess and $d$ equals the average diameter of the recess.

2. A fluid actuated coupling assembly as defined in claim 1 in which the end or the ends of the recess is flute-formed so as to eliminate the risk of splitting the outer sleeve and the inner sleeve apart.

3. Fluid actuated coupling assemblies according to claim 2, in which the recess flutes are partly filled with an element of substantially the same coefficient of expansion as the inner sleeve and the outer sleeve.

4. Fluid actuated coupling assembly according to claim 2, in which the recess flutes are partly filled up with a separate element reducing the size thereof to a size corresponding to the width of the recess at the maximum.

5. A fluid actuated coupling assembly according to claim 1 in which the means for introducing pressure fluid into the recess comprises a bore communicating the recess with the exterior, a sealing piston provided in said bore and a screw means for forcing the sealing piston into the bore.

6. Fluid actuated coupling assembly according to claim 1, in which the means for introducing pressure fluid into the recess comprises an axial groove, a sealing ring piston provided in said groove and a collar pressure ring engaging the ring piston and forces same into the groove by means of several screw means engaging the collar pressure ring with the outer sleeve.

7. A fluid actuated coupling assembly according to claim 1 in which the means for introducing pressurized fluid into the recess comprises an external pressure supply, a one way valve communicating the recess with the pressure fluid supply thereby permitting the introduction of pressure fluid in the recess and preventing exhaust of pressure fluid therefrom.

8. A fluid actuated coupling assembly according to claim 1 in which the pressure fluid is mixed up with particals having a coefficient of expansion which is less than that of the pressure fluid or preferably the same as that of the outer sleeve and the inner sleeve.

9. A fluid actuated coupling assembly according to claim 1, in which the outer sleeve and/or the inner sleeve are formed with radial extensions reducing the necessary amount of pressure fluid in the recess.

* * * * *

UNITED STATES PATENT AND TRADEMARK OFFICE
CERTIFICATE OF CORRECTION

PATENT NO. : 4,093,052
DATED : June 6, 1978
INVENTOR(S) : Curt Gunnar Falk

It is certified that error appears in the above—identified patent and that said Letters Patent are hereby corrected as shown below:

Column 5, line 32, the formula reading $t/d = 2 \times 10^{-2}$ should read $t/d \leq 2 \times 10^{-2}$.

Signed and Sealed this

Thirty-first Day of July 1979

[SEAL]

Attest:

Attesting Officer

LUTRELLE F. PARKER
Acting Commissioner of Patents and Trademarks